Feb. 10, 1942.  A. E. RATHBUN  2,272,885
SEAT CONSTRUCTION
Filed Oct. 28, 1938    4 Sheets-Sheet 1

INVENTOR.
Alan E. Rathbun
BY Ely & Frye
ATTORNEYS

Feb. 10, 1942.  A. E. RATHBUN  2,272,885
SEAT CONSTRUCTION
Filed Oct. 28, 1938  4 Sheets-Sheet 2
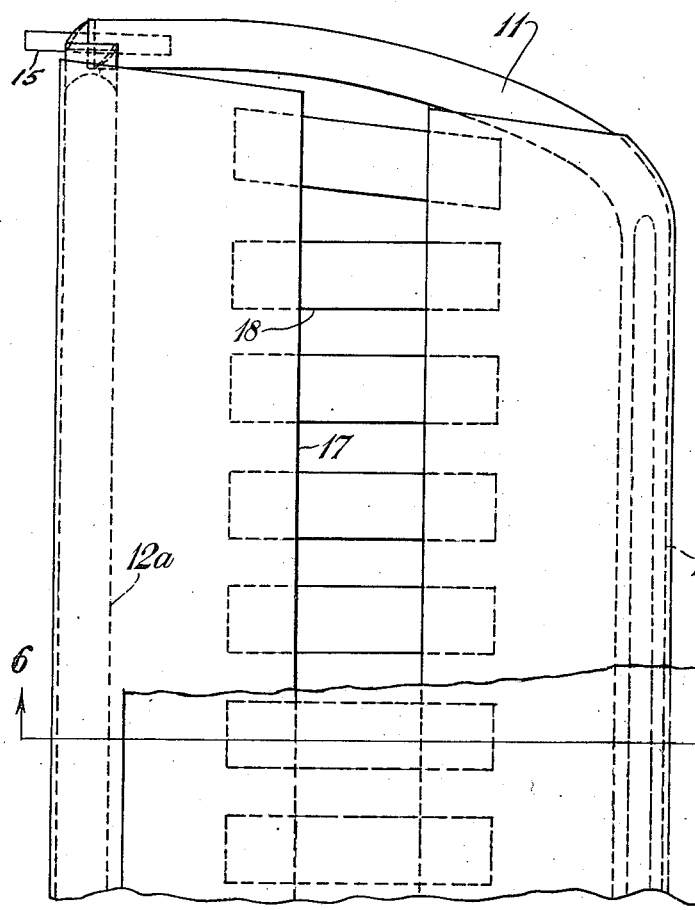
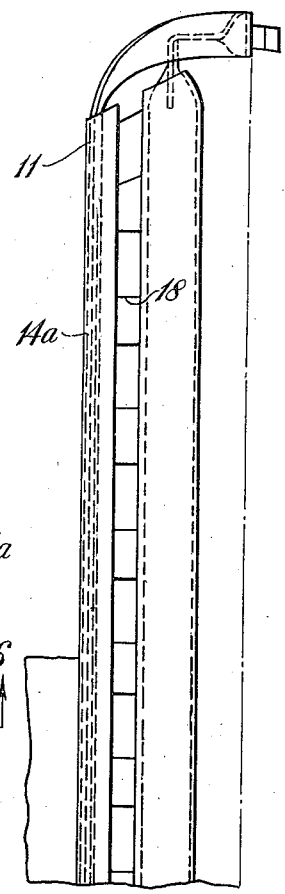
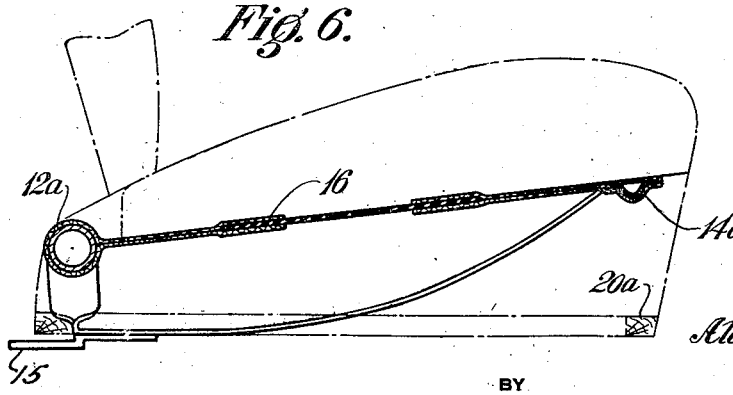
INVENTOR
Alan E. Rathbun
BY
Ely & Frye
ATTORNEYS

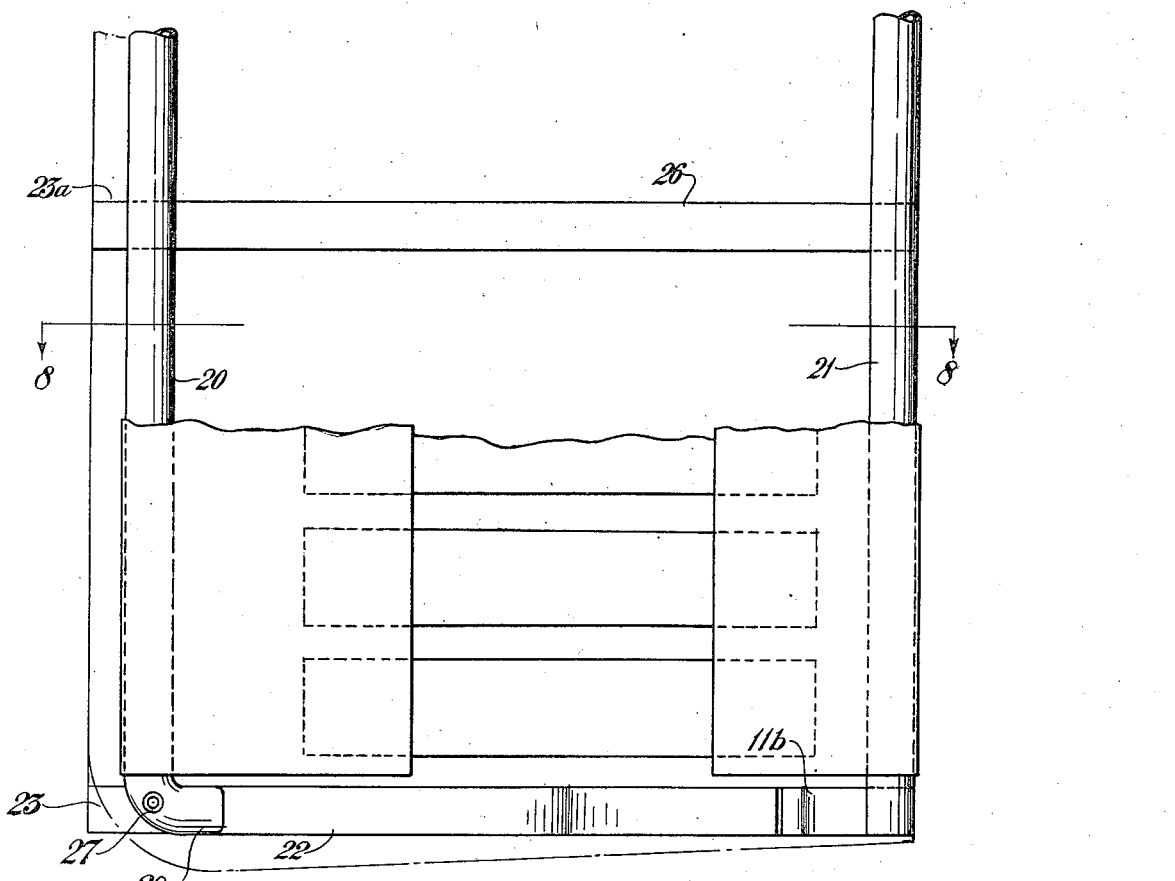
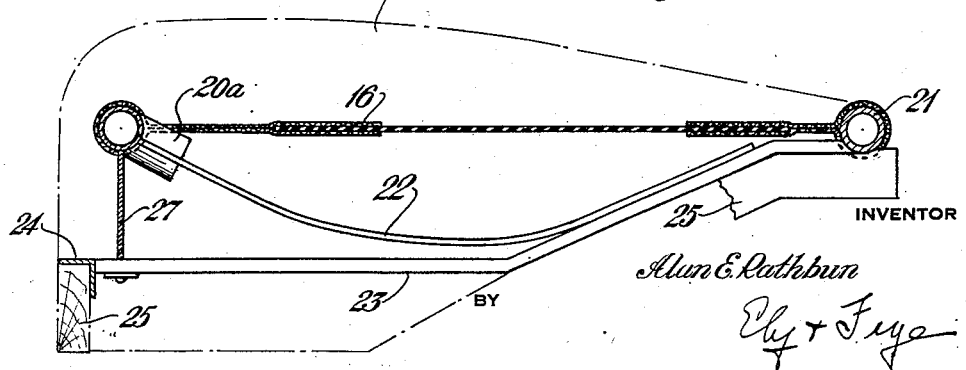

Feb. 10, 1942.     A. E. RATHBUN     2,272,885
SEAT CONSTRUCTION
Filed Oct. 28, 1938     4 Sheets-Sheet 4
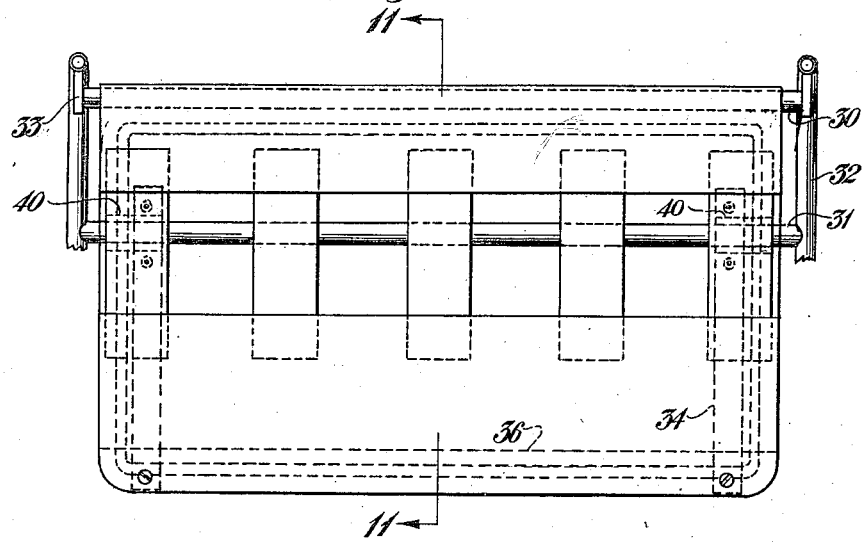
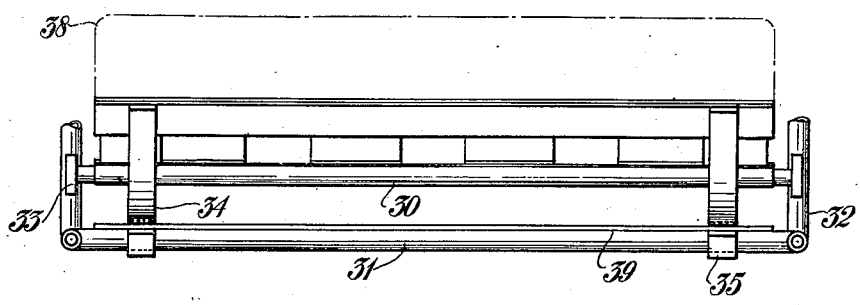
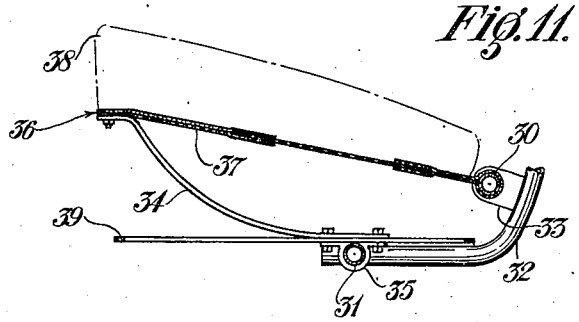
INVENTOR
Alan E. Rathbun
BY
ATTORNEYS Patented Feb. 10, 1942

2,272,885

UNITED STATES PATENT OFFICE 2,272,885

SEAT CONSTRUCTION

Alan E. Rathbun, Akron, Ohio, assignor to The Firestone Tire & Rubber Company, Akron, Ohio, a corporation of Ohio Application October 28, 1938, Serial No. 237,424

4 Claims. (Cl. 155—179)

This invention relates generally to seats, more especially to resilient seat supports and seats including the seat supports of the invention.

Efforts have been made to adapt porous rubber cushions for use in vehicles but one difficulty encountered is that the rubber cushion is appreciably more expensive than ordinary spring, or upholstery cushions used as standard construction. Reducing the volume of rubber used detracts from the favorable characteristics of the rubber, thus necessitating providing further resiliency by other means. Furthermore, the space which the cushion may occupy is limited, due to the modern tendency towards low over-all height cars, while there must be a minimum, or no, moving parts in the seat, since such parts either require lubrication or else tend to wear out rapidly, or be broken easily.

The general objects of the invention are to provide a novel seat support which provides resiliency under load while being sufficiently resistant to distortion to provide the desired load support; to provide a resilient seat support which absorbs the road shocks produced in vehicular movement; to provide a seat having a low initial rate of seat-load deflection to give the seat softness to the touch, which rate increases sharply as load is applied; to reduce the weight of seats; and to provide a suspended, porous rubber seat of substantially the same over-all heighth as spring or upholstery cushions.

A specific object of the invention is to provide a novel support for seats, which support is sturdily but inexpensively constructed.

Another object is to provide a seat which can readily be secured in or removed from its position in a vehicle. These and other objects will be manifest from the following specification.

In the accompanying drawings:

Figure 4 is a plan view, similar to Figure 1, of a modification of the invention;

Figure 5 is a front elevation of the seat of Figure 4;

Figure 6 is a transverse section taken on line 6—6 of Figure 4;

Figure 7 is a plan view, similar to Figure 1, of a further modification of the invention;

Figure 8 is a transverse section taken on line 8—8 of Figure 7;

Figure 9 is a plan view of another embodiment of the invention;

Figure 10 is a front elevation of the seat of Figure 9; and

Figure 11 is a vertical section on line 11—11 of Figure 9.

Broadly speaking, the present invention comprises providing a frame, or support for a seat, the frame including opposed side members which are made from a resilient material, such as a leaf spring. The frame, or side members thereof are fixedly secured to a vehicle adjacent the rear of the frame and the resilient members curve forwardly and upwardly from the rear portion of the frame to suspend the front thereof in a higher plane than the rear of the frame. The front of the frame is supported solely by the resilient side members although a resilient supporting sheet is secured between the front and rear of the frame to provide a surface for load application. Then, under load application, the front portion of the frame will be depressed, as the resilient side members are urged downwardly, or flattened by the load carried thereby. Preferably a cushioning material, such as a porous rubber pad is carried on the supporting sheet associated with the frame whereby the desired softness and initial low rate of seat-load distortion is provided in the seat as a whole.

Figure 1:
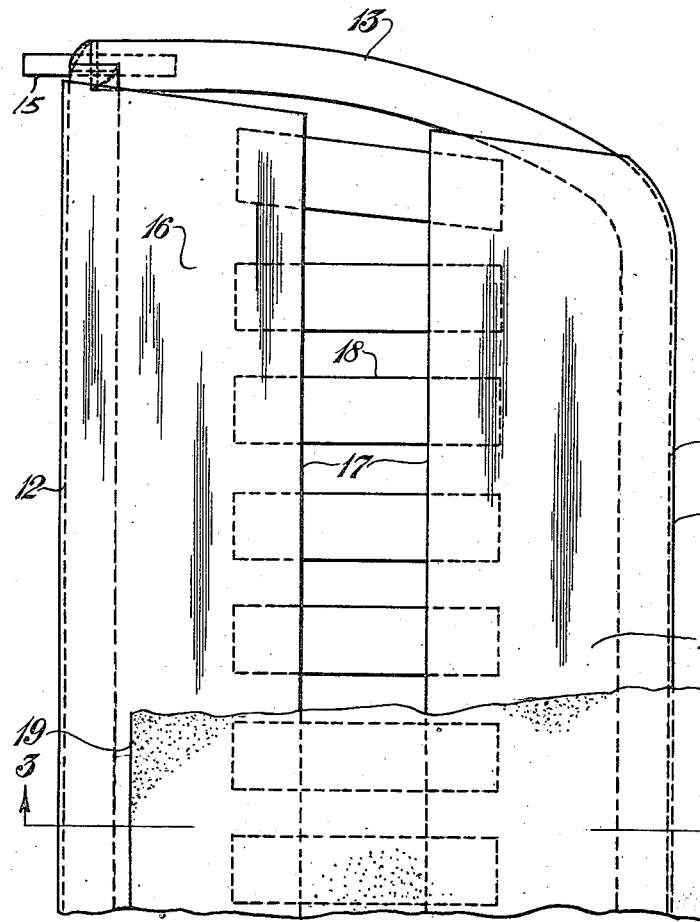
Figure 1 is a plan view, with the cushion thereon partially broken away, of one embodiment of the invention.
Figure 2:
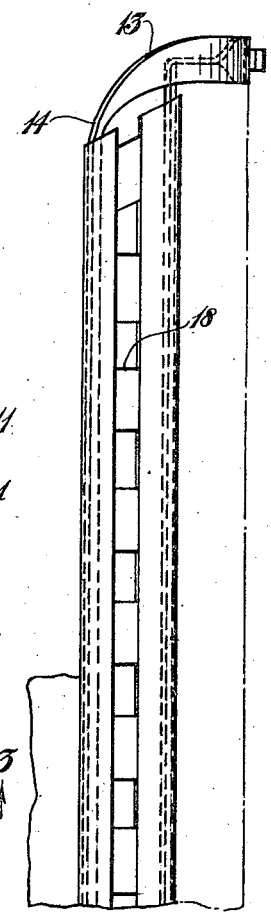
Figure 2 is a front elevation of the seat of Figure 1.
Figure 3:
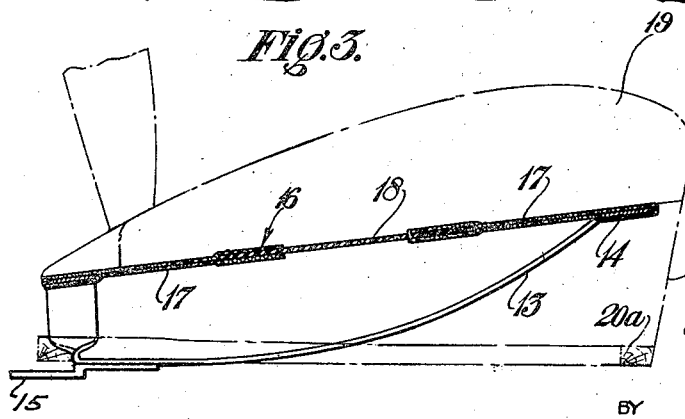
Figure 3 is a transverse section taken on line 3—3 of Figure 1.

Referring specifically to Figure 1 of the drawings, a seat support, indicated generally at 10, is shown and it includes a substantially quadrangular frame 11 which is formed from resilient material, such as leaf spring. Figures 1 and 2 show that the frame 11 consists of a rear portion 12, side portions 13 which are below the ends of the rear portion 12 and which curve upwardly and forwardly from the rear of the frame 11, and a front portion 14 that is in a substantially higher plane than the rear portion 12. In the embodiment of the invention shown, the frame 11 is made from an integral piece of leaf spring which is bent downwardly sharply and then twisted 90° on its longitudinal axis at the ends of the rear portion 12. This permits the spring to extend forwardly from the ends of the rear portion 12 and form the upwardly extending side portions 13, the ends of which are gradually, and then sharply curved in towards each other to connect through the front portion 14. Brackets, or arms 15, are secured to the side portions 13 adjacent the rear of the frame 11. These brackets are adapted to engage with sockets in the vehicle in which the seat support 10 is to be used to secure the seat support for load application. By mounting the seat support in this manner, the side portions 13 curve upwardly from the base, or floor of the vehicle, as indicated in Figure 3, so that the front portion 14 is supported solely by the upwardly curved ends of the side portions 13. This construction is a salient feature of the invention and differs it from all seats now known to me. Thus the front portion 14 is resiliently supported and can be distorted downwardly under load, as load tends to flatten or straighten out the upwardly curved side portions 13.

In order to provide a surface through which load can easily be applied to the frame 11, a resilient supporting sheet 16 is secured between the front and rear portions of the frame. In this instance, the supporting sheet 16 includes the fabric sheets 17, each of which is looped around one of the front or rear portions of the frame. Fabric sheets 17 are secured together by a plurality of rubber strips 18 which tighten the sheets in the frame 11 to form the supporting sheet 16 that is distortable under load. Certain of the rubber strips may be more resistant to deflection than the remainder, if desired. The rubber strips 18 are secured to the fabric sheets 17 by vulcanization, as shown, or by any other suitable means. It should be noted that other resilient means can be substituted for the supporting sheet 16, for example, a single rubber sheet could extend between the front and rear portions of the frame 11, or a plurality of rubber strips might extend the depth of the frame 11. In all events, a resilient supporting sheet is provided so that a pad 19, such as the one made from porous sponge rubber shown, may be placed upon the supporting sheet 16 and held in such position by an upholstery cover 20, or other suitable means, as indicated in Figure 3. The cover 20 is held in place by securing it to a tacking frame 20a.

Provision of the pad 19 provides a seat which initially has the desired softness of touch, that is, a low rate of seatload deflection when the load initially is applied; the rate progressively increasing under increasingly greater loads. This action is due to the initial ready compressibility of the pad 19, a greater force being required to distort the sheet 16, and still a greater force being necessary to depress the forward portion of the frame 11 an appreciable amount against the action of the leaf springs 13. The latter also have a gradually increasing load-deflection rate owing to the progressive flattening action exerted on the springs by the load. The rate is increased further by the action of the supporting sheet 16 as flattening, or depressing the front portions of the leaf springs 13 tensions the rubber strips 18. Thus complete bottoming of the seat is avoided.

Figure 3 indicates the relative position of the seat support 10 to the back cushion of a seat. This indicates that the rubber strips 18 are positioned in a portion of the supporting seat 16 carrying the greatest amount of load whereby the greatest distortion of the seat may occur at that point, and that the pad 19 protects a person upon the seat from striking the front portion 14 of the frame on load change.

Figure 4 shows a modified embodiment of the invention in which a rear portion 12a of the frame 11 is not integral with the remainder of the frame 11. The rear portion 12a may be made from tubular material, as shown. A feature of the invention, shown in this embodiment thereof, is that the front portion 14a of the frame is channelled to increase its resistance to longitudinal deflection when load is applied to only one portion thereof. Thus, the frame 11 functions to distribute a localized load on the front portion 14a over the total front portion of the frame.

In Figure 7, a seat support having a frame 11b that includes a tubular front member 20, a tubular rear member 21, and resilient side members 22, is shown. It should be noted that the front member 20 has slotted end portions 20a, to which the side members 22 are secured, extending at substantially right angles therefrom. The side members 22 do not extend the depth of the frame 11b as the rear portions thereof are secured to arms 23 which are secured to the rear member 21 and bent downwardly therefrom. The arms 23 extend forwardly farther than the side members 22 and carry brackets 24 by which the frame 11b can be secured to a wooden seat support 25 to position it on a vehicle. In addition to the side members 22, which support the front member 20, a third resilient member 26 can be secured between the front and rear members of the frame, being carried by an arm 23a similar to the arms 23. Thus the resilient member 26 is spaced below the plane of the frame 11b a sufficient distance to prevent bottoming against the member 25 under load. A supporting sheet 16 similar to that shown in the other embodiments of the invention is used in conjunction with the frame 11b.

To limit the possible rebound of the frame 11b upon sudden removal of load, cables 27 are secured to the front member 20 adjacent each end thereof and connect to the arms 23. These cables must be flexible, and may be made from steel, if desired. They serve to dampen the vibrations of the frame 11b on sudden load changes.

Attention is now directed to Figure 9 in which the seat construction of the invention is applied to a seat particularly suitable for supporting one person at a time. Here a rear tubular member 30 is connected to a transversely extending tubular member or bar 31 by side members 32. Brackets 33 are carried by the side members 32 to secure the rear member 30 thereto. Upwardly and forwardly extending spring members 34 are fixedly mounted on the bar 31 by curved metal strips 35 which are secured to the springs and engage with the bar to prevent relative movement therebetween. A front support 36 is carried by the spring members 34 to provide a ready load-receiving member in the seat.

To facilitate load support by the seat construction, a supporting sheet 37, similar to the sheet 16, is secured between the rear member 30 and the front member 36. Thus, a cushion, indicated in dotted lines at 38, can be placed on the sheet 37 and load applied thereto will be transferred to the front and rear members of the seat by the sheet 37. Naturally load depresses the sheet 37 as well as the forward ends of the spring members. A stiff, deflectible wire tacking strip 39 may be associated with the seat construction by means of metal strips 40 carried by said spring members. Fabric means stretched over the cushion 38 then can be secured to this tacking strip. A special feature of this construction is that it is lighter than the type of seat now used, which seat includes a solid bottom, and a larger cushion and more framework than the present construction. This embodiment of the invention also possesses the advantages of the other embodiments and obviously may be substituted therefor, when desired. It is particularly designed for service in non-removable seats where the member 30 and bar 31 are fixedly secured in position.

No specific means are shown for supporting the seat shown in Figures 9 to 11, for this may be done in any desired manner and it does not constitute part of the invention.

In some instances it is desirable to secure the supporting sheet 16 in the frame so tightly that it stresses the resilient side members by drawing them upwardly beyond their normal no-load position. This increases the resistance to distortion, or the load-carrying ability of the supporting sheet, since it is further tensioned by the elongation thereof produced in flattening the side springs.

A further feature of the seat construction of the invention is that it has reduced load rebound, or pitching characteristics. This results from the supporting sheet losing a major proportion of its tension as it approaches no-load position whereby the rebounding force that it produces is greatly decreased; and from the increase in compression that must be produced in the resilient side members by rebound of the seat since the side members are compressed or drawn upward slightly by the supporting sheet under no-load conditions.

From the foregoing description, it is seen that a sturdy, resilient seat support is provided by the invention. This support is adapted to withstand long and severe usage without breakage, since it includes no movable parts and the only deflectible part thereof is adapted to take flexing, no frail, or movable parts being present. Thus, no lubrication is required and the seat will serve satisfactorily for an indefinite period, as laboratory tests have shown. The seat support provides sufficient resiliency that the depth of cushioning material used therewith can be reduced to a minimum, thus decreasing the cost of the seat and realizing the objects of the invention hereinbefore set forth.

In accordance with the patent statutes, I have illustrated and described an embodiment of my invention, although it will be understood that various modifications can be made without departing from the scope of the invention as defined in the appended claims.

What is claimed is:

1. A seat support comprising a spring bar which is bent to form a substantially quadrangular frame having front and rear portions which are in substantially the same plane, said rear portions being bent downwardly at the ends thereof and the side portions of said frame being bent upwardly and forwardly to connect with said front portion, and means associated with the rear portions of said side portions for positioning said frame whereby the front of said frame is supported for resilient movement when load is placed thereon.

2. A seat support comprising a resilient, substantially rectangular frame, said frame being made from an integral leaf spring which has a front portion in a relatively higher plane than the rear portion of said frame, the front and rear portions being connected by forwardly and upwardly curved arms.

3. In a seat support, a substantially quadrangular frame having integral front and side members formed of a resilient material, said frame being secured adjacent the rear thereof and having upwardly and forwardly projecting side members which are the sole support for said front member, said front member being channel-shaped in section for stiffening the frame laterally.

4. In a seat support, a frame having front and side members formed of a resilient material, said front member being depressible by load and having a curved shape in section whereby said front member is resistant to lateral deflection by a localized load.

ALAN E. RATHBUN.